W. B. HUTHER.
INSERTED TOOTH CUTTER HEAD AND METHOD OF MAKING THE SAME.
APPLICATION FILED FEB. 14, 1920.
1,376,438.
Patented May 3, 1921.
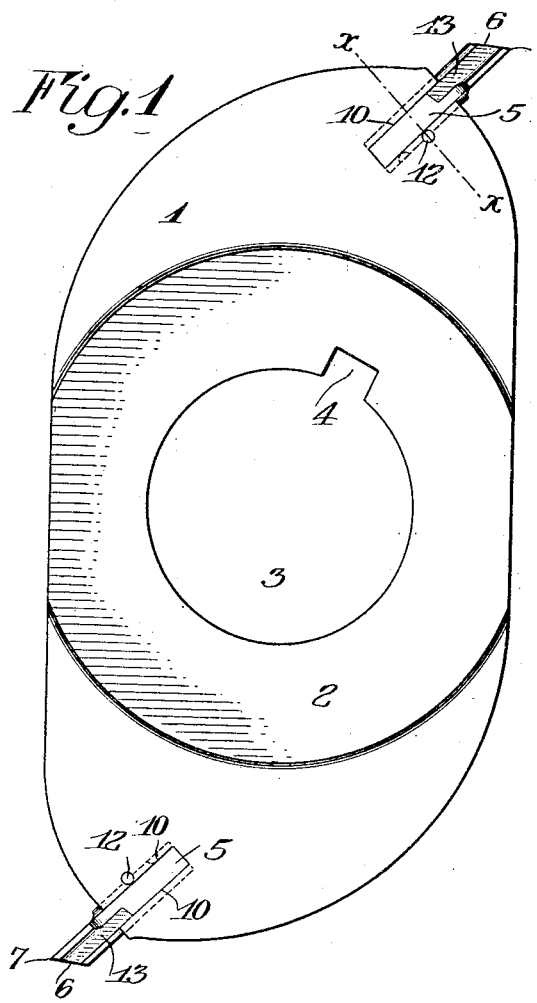
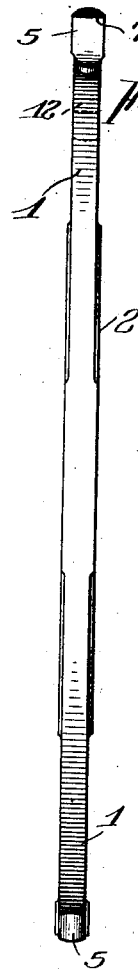
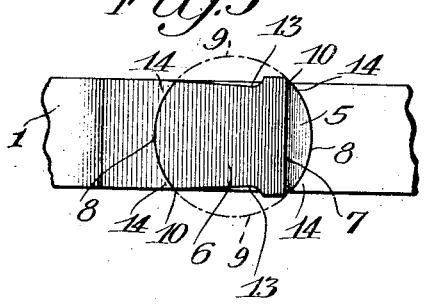
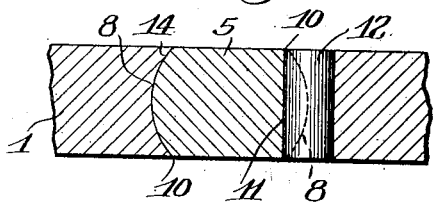
INVENTOR
Warren B. Huther
BY
his ATTORNEY

UNITED STATES PATENT OFFICE.

WARREN B. HUTHER, OF ROCHESTER, NEW YORK, ASSIGNOR TO HUTHER BROS. SAW MFG. CO., OF ROCHESTER, NEW YORK, A CORPORATION OF NEW YORK.

INSERTED-TOOTH CUTTER-HEAD AND METHOD OF MAKING THE SAME.

1,376,438.     Specification of Letters Patent.     Patented May 3, 1921.

Application filed February 14, 1920. Serial No. 358,615.

*To all whom it may concern:*

Be it known that I, WARREN B. HUTHER, of Rochester, in the county of Monroe and State of New York, have invented certain new and useful Improvements in Inserted-Tooth Cutter-Heads and Methods of Making the Same; and I do hereby declare the following to be a full, clear, and exact description of the same, reference being had to the accompanying drawings, forming a part of this specification, and to the reference numerals marked thereon.

This invention relates to tools or devices of that class used for cutting wood or metal or other substances, and comprising a head or stock adapted for rigid attachment to a revoluble shaft or other operative means and having renewable cutters for slitting, grooving, routing or otherwise shaping the substance operated upon.

The invention has for its main object to reduce the cost of making the renewable cutters, and of seating and fastening them securely in the cutter head so that the device may be confidently used without danger to the operator who may at any time easily remove an overworn or broken cutter from the head and quickly and easily substitute a new cutter, thus avoiding the delay and expense incident to sending the device to its maker for repairs.

My invention contemplates constructing the cutter from a round metal rod requiring no special tooling of its shank portion preparatory to its insertion in the cutterhead, and fitting and locking the cutter in the head by means of simple and inexpensive drilling operations first producing in the cutter head an edgewise and preferably tangentially directed hole forming without further tooling or fitting a seat receiving the cutter shank which is driven into the drilled seat and then securely locked therein by a metal pin or key passed transversely through another hole drilled through the cutter head and cutter at the joint between them. The surplus thickness of the round cutter shank is then dressed off flush with the opposite side walls or faces of the cutter head and the protruding end portion of the cutter is also relieved or backed off to provide necessary side clearance behind the cutting edge.

The invention will first be described with reference to the accompanying drawings and then will be particularly defined in the claims at the end of this specification.

In the drawings:

Figure 1 is a side view of a finished cutter head constructed in accordance with and illustrating one embodiment of this invention;

Fig. 2 is an edge view of the cutter head;

Fig. 3 is an enlarged fragmentary detail edge view at one of the cutters and includes dotted lines showing the surplus segments which had been dressed off the cutter shank after it was driven into and locked within its seat in the cutter head, and Fig. 4 is an enlarged detail cross-sectional view taken on the line $x$—$x$ in Fig. 1.

Similar reference numerals throughout the several views indicate the same parts.

The numeral 1 indicates the plate or body portion of the improved cutter head which preferably has a thickened hub 2 provided with a central opening 3 into which opens a radial slot 4 serving as a seat for a key by which the cutter head may be secured upon the revoluble shaft of any machine or device adapted for cutting or shaping wood, metal or other substances.

Two of the improved renewable cutters 5, are produced in their first form by simply cutting a round steel rod of exact or standard diameter upon an angle of about forty-five degrees, thereby providing at one operation the clearance bevel 6 of both cutters behind their end cutting edge 7. When thus initially formed from a round rod which is sufficiently shown by opposed curved full lines 8, 8 and opposed curved dotted lines 9, 9 in Fig. 3, the cutters may be fitted in and fastened to the head plate in the manner next described.

The head plate 1 is temporarily placed in a suitable jig which will safely guide an ordinary drill having a diameter greater than the thickness of the plate while it bores edgewise in the plate inwardly from the periphery and preferably tangentially, a rounded recess or opening which extends at 10, 10 clear through opposite side faces of the plate. Within the body of the plate this drilled opening has transversely concaved opposing walls indicated by the full lines 8, 8 in Fig. 3, and by full and dotted lines 8, 8 in Fig. 4, the area of the opening thus formed between these walls being such that the round shank of the cutter 5 may be snugly driven into it. This being done, a transverse hole 11 is drilled through portions of the head plate 1 and the cutter 5, at the joint between them, and a key 12, cut from a round steel rod of standard size is tightly driven into the hole 11, to securely lock the cutter in the head, as shown in Figs. 1 and 4 of the drawings.

Those portions of the round cutter shank 5 which now project beyond opposite side walls of the head plate 1, and are indicated within the convex dotted lines 9, 9 in Fig. 3, are now dressed off thus leaving the cutter shank about flush with said plate walls; and the opposite side walls of the protruding end of the cutter are milled or otherwise reduced at 13 behind its front edge to assure back clearance for the cutting edge 7 until it is entirely worn away by intermittent sharpenings. If desired, those projecting side portions of the cutter shank shown within the dotted lines 9, 9 in Fig. 3 may be dressed off and the back clearance 13 for the cutting edge be produced on the cutter prior to tempering the cutter and before inserting and fastening it in the head plate 1.

Special mention is made of the edgewise boring of the cutter head plate 1 by a drill having a diameter greater than the thickness of the plate, since this assures that the comparatively large radius upon which the front and rear or opposed seat surfaces 8, 8 are transversely curved provides overlocking plate portions or lips 14 at opposite faces of the plate along the opposing edges of the drilled opening. These lips have very strong obtuse angular formation, shown in Figs. 3 and 4, and they therefore are not liable to chip off or crumble should the work be unduly forced to the cutter head, thus promoting the safety of both the operator and the work. Furthermore, the use of a drill of such relatively large diameter assures a very wide and strong cutter shank between the seat faces 8, 8, or gives the shank a thickness in direction of the working strains equal to the full diameter of the comparatively heavy rod from which the cutter was first formed and providing a renewable tooth cutter head which may be easily and inexpensively made and has maximum strength and durability in use.

I claim as my invention:

1. A cutter head comprising a supporting head or plate drilled edgewise thereby forming therein a seat having transversely curved sides of the same width as said head or plate, a cutter projecting beyond the margin of the plate and having a rounded shank fitted into said drilled seat, and a locking pin or key passed transversely through the plate and the cutter shank at the joint between them and securing the cutter to the head plate.

2. A cutter head comprising a supporting head or plate bored edgewise by a drill having a diameter greater than the thickness of the plate thereby providing opposed transversely concaved seat surfaces between which the drilled bore opens through opposite side faces of the plate, a cutter having a rounded shank fitting said transversely concaved seat surfaces and about flush with the opposite side faces of the plate, and a locking pin or key passed transversely through the plate and the cutter shank at the joint between them and securing the cutter to the head plate.

3. The herein described method of making a cutter head having replaceable cutters, consisting in drilling the head plate edgewise thereby forming therein a transversely concaved seat, inserting a cutter having a rounded shank into said drilled seat, and passing a locking pin or key transversely through the head plate and the cutter shank at the joint between them.

4. The herein described method of making a cutter head having replaceable cutters, consisting in boring the head plate edgewise by a drill having a diameter greater than the thickness of the plate thereby providing opposed transversely concaved seat surfaces between which the drilled bore opens through opposite side faces of the plate, inserting a cutter having a rounded shank into the opening thus drilled, passing a locking pin or key transversely through the head plate and the cutter shank at the joint between them, and dressing off the surplus laterally projecting portions of the cutter shank about flush with the opposite side faces of the head plate.

5. The combination with a cutter head having a projecting portion adapted to penetrate the work as the head is operated, of a removable cutter provided with rounded sides secured therein and of substantially the same width as the projecting portion of the head, the said projecting portion being provided with an inwardly extended recess having oppositely curved side walls open on opposite sides of the head and into which is placed said removable cutter, and a transversely disposed key in coöperation with the head and cutter throughout the full width of each to retain the same in position.

6. The process of making a cutter head with removable cutters which comprises simultaneously forming two cutting edges with their clearance bevels by cutting a bar of rounded stock material at substantially 45 degrees, forming a hole in said cutter head inwardly from the periphery thereof of larger diameter than the thickness of the head and of approximately the size of the stock material, inserting a cutter in said hole, making a transverse hole through both the head and cutter, and inserting a key therein to retain the cutter in place.

7. The combination with a relatively thin cutter head provided with an inwardly extending recess on its outer edge, said recess being open on the sides thereof for its entire length and having front and rear walls which are not plane surfaces, of a cutter tooth having its cutting edge wider than the relatively thin head to afford the necessary clearance, fitted within said recess and prevented from lateral movement by coöperation with said front and rear walls, and means for retaining said tooth in said recess.

8. The process of forming cutter heads which comprises making an inwardly extending hole on the outer edge of the cutter head, securing a tooth of stock or bar material into said hole and grinding down opposite faces of said tooth for its full length within the cutter head and opposite faces of the cutter head to an amount less than the effective width of the cutting edge of said tooth to afford the necessary clearance.

WARREN B. HUTHER.